United States Patent
Chien et al.

(10) Patent No.: US 7,266,623 B2
(45) Date of Patent: Sep. 4, 2007

(54) PORTABLE COMPUTER

(75) Inventors: Tsan-Nan Chien, Taipei (TW); Yen-Chun Chang, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 444 days.

(21) Appl. No.: 11/028,005

(22) Filed: Jan. 4, 2005

(65) Prior Publication Data

US 2005/0172044 A1  Aug. 4, 2005

(30) Foreign Application Priority Data

Feb. 4, 2004  (TW) .............................. 93102554 A

(51) Int. Cl.
*G06F 13/10* (2006.01)
*G06F 13/00* (2006.01)

(52) U.S. Cl. ..................... 710/62; 710/72; 711/111; 714/7

(58) Field of Classification Search ............... 710/2, 710/8, 36–38, 62–64, 72–74; 711/112–114; 712/7

See application file for complete search history.

(56) References Cited

U.S. PATENT DOCUMENTS 5,327,549 A * 7/1994 Nissimov et al. ............. 713/2
5,649,233 A * 7/1997 Chen .............................. 710/8
6,073,188 A * 6/2000 Fleming ...................... 710/38
6,098,127 A * 8/2000 Kwang ........................ 710/62
6,687,775 B1 * 2/2004 Bassett ........................ 710/70
6,769,042 B2 * 7/2004 Kato et al. .................... 710/74
6,898,730 B1 * 5/2005 Hanan ............................ 714/7
6,922,739 B2 * 7/2005 Core ........................... 710/22
2005/0172044 A1 * 8/2005 Chien et al. .................. 710/8

* cited by examiner

*Primary Examiner*—Christopher Shin
(74) *Attorney, Agent, or Firm*—Rabin & Berdo, P.C.

(57) ABSTRACT

A portable computer can be selectively configured with a first hard disk or a second hard disk. The portable computer includes a controller, an interface connector, and a second interface adapter. The controller includes a first interface controlling unit and a second interface controlling, for respectively controlling the first hard disk and the second hard disk. The interface connector, electrically coupled with the first interface controlling unit and the second interface controlling unit, can be selectively electrically coupled with the first hard disk or the second hard disk. Parts of the ground pins and the floating pins of the interface connector are provided for transmitting signals to the second hard disk. Parts of the ground pins and the power pins are commonly used by the first and the second hard disks.

16 Claims, 4 Drawing Sheets

US 7,266,623 B2

PORTABLE COMPUTER

This application claims the benefit of Taiwan application Serial No. 93102554, filed Feb. 4, 2004, the subject matter of which is incorporated herein by reference.

BACKGROUND OF THE INVENTION

1. Field of the Invention

The invention relates in general to a portable computer, and more particularly to a portable computer, which can be selectively configured with an integrated drive electronics (IDE) hard disk or a serial advanced technology attachment (SATA) hard disk via a single interface connector.

2. Description of the Related Art

In the past, a portable computer is configured with an IDE hard disk and transmits data and power signals to the IDE hard disk via a 44-pin interface connector. In order to improve data transmission rate, the new-generation portable computer is configured with a SATA hard disk. The novel SATA hard disk has only 22 pins, which is incompatible with the 44-pin IDE hard disk. Therefore, the portable computer can only be configured with the IDE hard disk and the SATA hard disk respectively via the IDE interface connector and the SATA interface connector.

Referring to FIG. 1, a block diagram of a conventional portable computer configured with an IDE hard disk and a SATA hard disk is shown. The portable computer 100 has a circuit board 105, which includes a controller 110 (such as a south bridge chip), an IDE interface connector 121, and a SATA interface connector 122. The controller 110 includes an IDE-interface controlling unit 111 and a SATA-interface controlling unit 112, which can be respectively electrically coupled with an IDE hard disk 131 and a SATA hard disk 132 via an IDE interface connector 121 and a SATA interface connector 122.

However, in order that the portable computer 100 can be configured with the IDE hard disk 131 (or a CD-ROM drive), and the new-generation SATA hard disk 132, a SATA interface connector 122 has to be added into the portable computer 100 for coupling the SATA hard disk 132 in addition to the IDE interface connector 121. Therefore, the volume of the portable computer 100 has to be increased, which cannot satisfy the requirement that a portable computer is designed to be thin and small.

SUMMARY OF THE INVENTION

It is therefore an object of the invention to provide a novel portable computer. By the original pin design of the IDE interface connector, as the portable computer is selected to be configured with the IDE hard disk, the IDE-interface controlling unit of the controller can control the IDE hard disk via the IDE interface connector, and as the portable computer is selected to be configured with the SATA hard disk, the SATA-interface controlling unit of the controller can control the SATA hard disk via the same IDE interface connector, and the IDE-interface controlling unit can control the CD-ROM drive simultaneously. Therefore, the requirement of reducing the volume of the portable computer can be achieved.

The invention achieves the above-identified object by providing a portable computer, which can be selectively configured with a first hard disk or a second hard disk. The portable computer includes a controller, an interface connector, and a second interface adapter. The controller includes a first interface controlling unit and a second interface controlling, for respectively controlling the first hard disk and the second hard disk. The interface connector, electrically coupled with the first interface controlling unit and the second interface controlling unit, can be selectively electrically coupled with the first hard disk or the second hard disk. The interface connector includes a number of first interface pins, second interface pins, and common pins. The first interface pins are electrically coupled with the first interface controlling unit, for outputting a plurality of first signals as the interface connector is electrically coupled with the first hard disk. The second interface pins are electrically coupled with the second interface controlling unit for outputting a plurality of second signals as the interface connector is electrically coupled with the second hard disk. The common pins are electrically coupled with the first interface controlling unit and the second interface controlling unit for outputting a ground voltage and a power voltage as the interface connector is electrically coupled with the first hard disk or the second hard disk.

The second interface adapter is provided for coupling the interface connector with the second hard disk and correspondingly electrically coupling the second interface pins and the common pins with the second hard disk as the portable computer is configured with the second hard disk. As the portable computer is configured with the first hard disk, the first interface controlling unit controls the first hard disk via the first interface pins and the common pins of the interface connector, and as the portable computer is configured with the second hard disk, the second interface controlling unit controls the second hard disk via the second interface pins and the common pins of the interface connector and via the second interface adapter.

The second interface adapter includes a first adapting part and a second adapting part for respectively electrically coupling with the interface connector and the second hard disk, and the second interface pins and the common pins of the interface connector are correspondingly electrically coupled with the second hard disk via the second adapting part. The portable computer includes a first interface adapter for coupling the interface connector with the first hard disk and correspondingly electrically coupling the first interface pins and the common pins with the first hard disk as the portable computer is configured with the first hard disk. By the pin design of the interface connector, the portable computer can be selectively configured with the first hard disk or the second hard disk, and the volume of the portable computer can be reduced.

The invention achieves the above-identified object by providing a portable computer, which can be selectively configured with a first hard disk or a second hard disk. The portable computer includes a controller, an interface connector, and a second interface adapter. The controller includes a first interface controlling unit and a second interface controlling unit, for respectively controlling the first hard disk and the second hard disk. The interface connector, electrically coupled with the first interface controlling unit and the second interface controlling unit, can be selectively electrically coupled with the first hard disk or the second hard disk. The interface connector includes a number of signal pins, power pins, ground pins, and floating pins. The signal pins are electrically coupled with the first interface controlling unit, for outputting a plurality of first signals as the interface connector is electrically coupled with the first hard disk. The power pins are electrically coupled with the first interface controlling unit, for outputting a first power voltage as the interface connector is electrically coupled with the first hard disk. Parts of the ground pins are electrically coupled with the first interface controlling unit, for outputting a ground voltage. The floating pins are not used by the first hard disk as the interface connector is electrically coupled with the first hard disk.

The second interface adapter is provided for coupling the interface connector with the second hard disk as the portable computer is configured with the second hard disk. As the portable computer is configured with the second hard disk, the second interface controlling unit outputs the power voltage to the second hard disk via the power pins and parts of the floating pins and via the second interface adapter. The second interface controlling unit outputs the ground voltage and a plurality of third signals to the second hard disk via parts of the ground pins and via the second interface adapter; and the second interface controlling unit outputs forth signals to the second hard disk via parts of the floating pins and the second interface adapter.

The second interface adapter includes a first adapting part and a second adapting part, for respectively electrically coupled with the interface connector and the second hard disk, and the power pins, the ground pins and the floating pins of the interface connector are correspondingly electrically coupled with the second hard disk via the second adapting part. The portable computer includes a first interface adapter for coupling the interface connector with the first hard disk and correspondingly electrically coupling the signal pins, the power pins, and the ground pins with the first hard disk as the portable computer is configured with the first hard disk. Therefore, by using parts of the ground pins and the floating pins of the interface connector to transmit signals to the second hard disk and parts of the ground pins and the power pins to provide the ground voltage and the power voltage for the first and the second hard disks, the portable computer can be selectively configured with the first hard disk or the second hard disk, and the volume of the portable computer can be reduced.

Other objects, features, and advantages of the invention will become apparent from the following detailed description of the preferred but non-limiting embodiments. The following description is made with reference to the accompanying drawings.

DETAILED DESCRIPTION OF THE INVENTION

In the portable computer of the invention, some ground pins and some pins that are no more used as the hard disk technique develops in the IDE interface connector are used for outputting signals to the SATA hard disk, while parts of the power pins and the ground pins are commonly used by the IDE hard disk and the SATA hard disk. Therefore, the portable computer can be selectively configured with the IDE hard disk or the SATA hard disk via an IDE interface connector, and thus the volume of the portable computer can be reduced.

Figure 1:
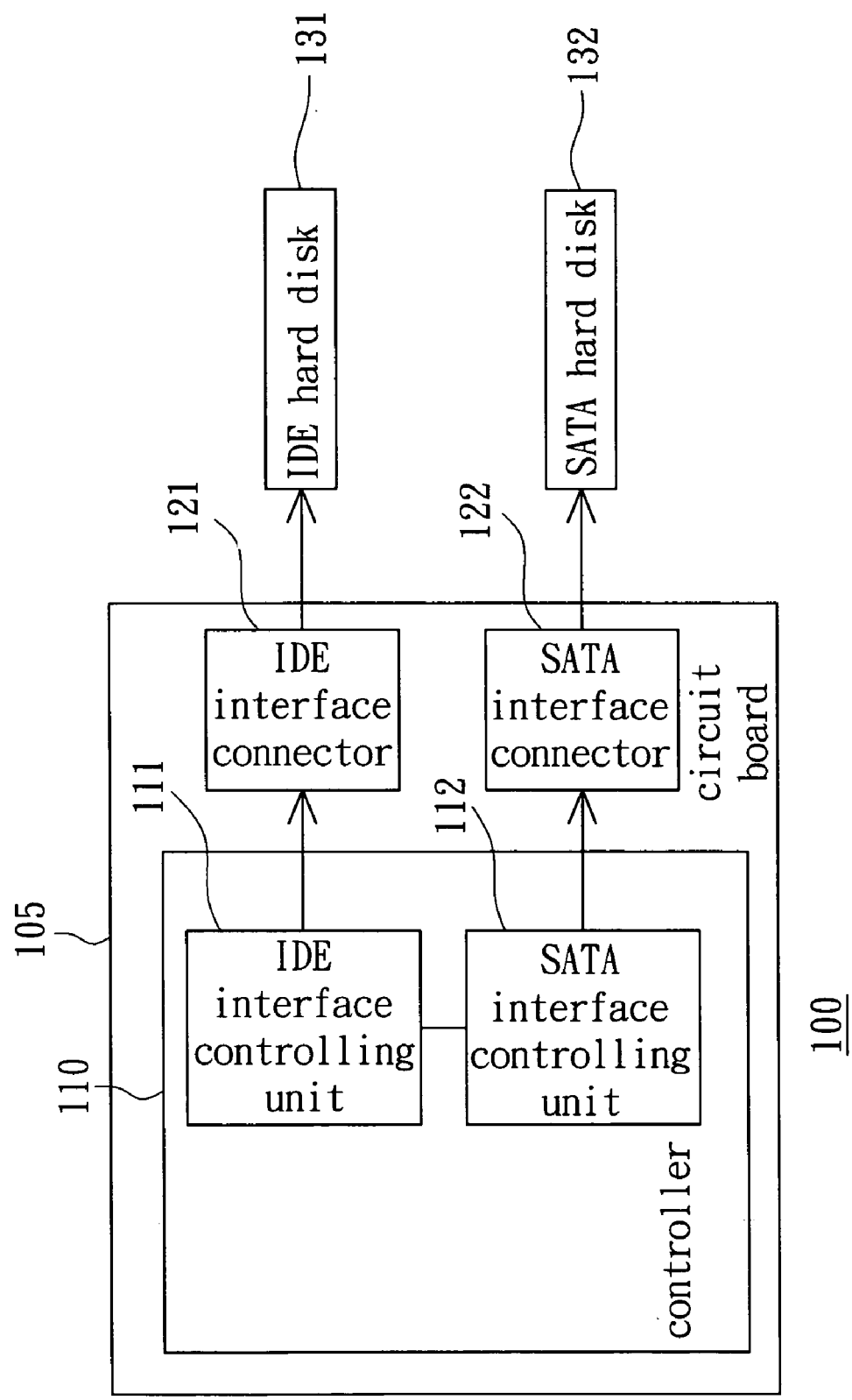
FIG. 1 is a block diagram of a conventional portable computer configured with an IDE hard disk and a SATA hard disk.
Figure 2A:
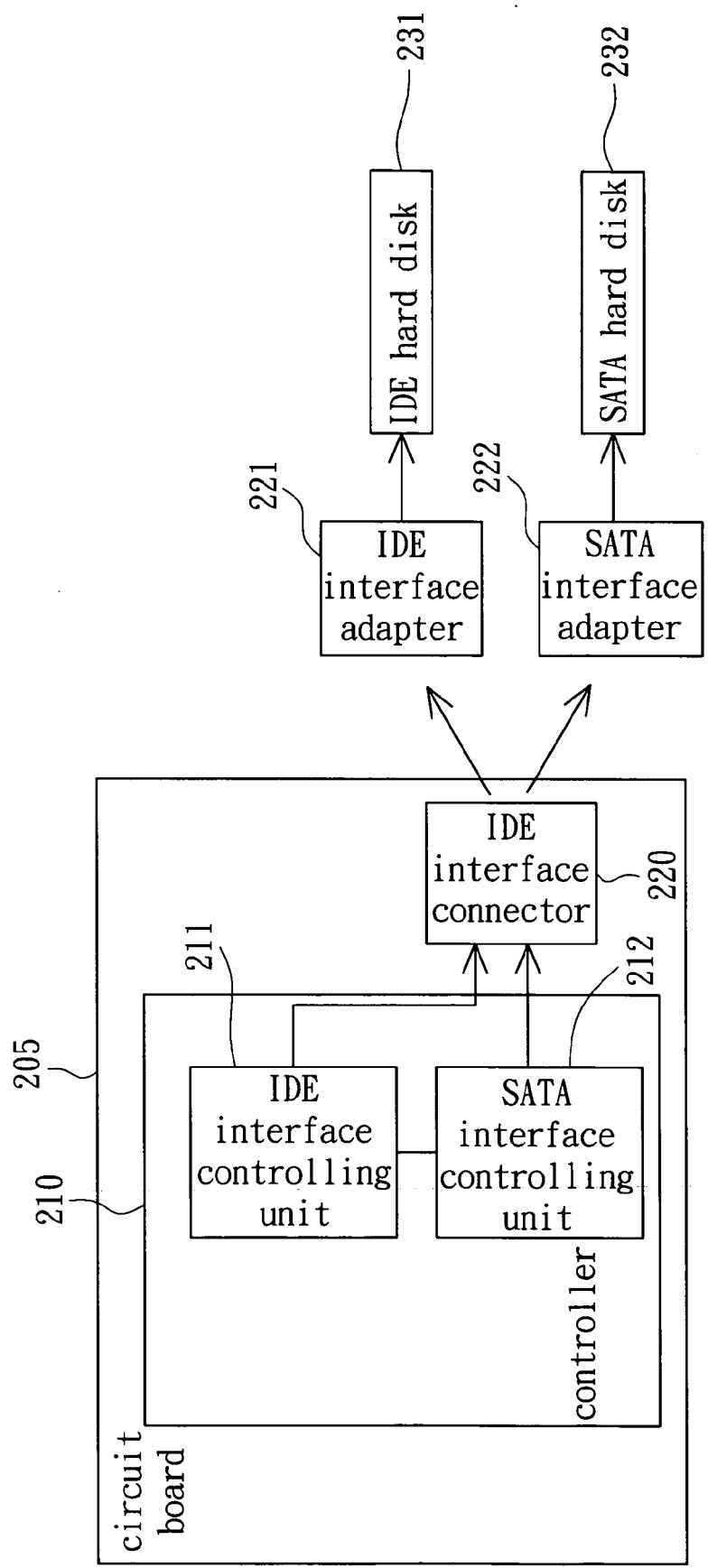
FIG. 2A is a block diagram of the selective configuration of the portable computer with the IDE hard disk or the SATA hard disk according to a preferred embodiment of the invention.

Referring to FIG. 2A, a block diagram of the selective configuration of the portable computer with the IDE hard disk or the SATA hard disk according to a preferred embodiment of the invention is shown. The portable computer 200 has a circuit board 205, which includes a controller 210, such as a south bridge chip, and an IDE interface connector 220. The controller 210 has an IDE-interface controlling unit 211 and a SATA-interface controlling unit 212 for respectively controlling an IDE hard disk 231 and a SATA hard disk 232. The IDE interface connector 220, electrically coupled with the IDE-interface controlling unit 211 and the SATA-interface controlling unit 212, can be selectively electrically coupled with the IDE hard disk 231 or the SATA hard disk 232.

The portable computer 200 has an IDE interface adapter 221 and a SATA interface adapter 222. As the portable computer 200 is configured with the IDE hard disk 231, the IDE interface adapter 221 electrically couples the IDE interface connector 220 with the IDE hard disk 231. As the portable computer 200 is configured with the SATA hard disk 232, the SATA interface adapter 223 electrically couples the IDE interface connector 220 with the SATA hard disk 232.

Figure 2B:
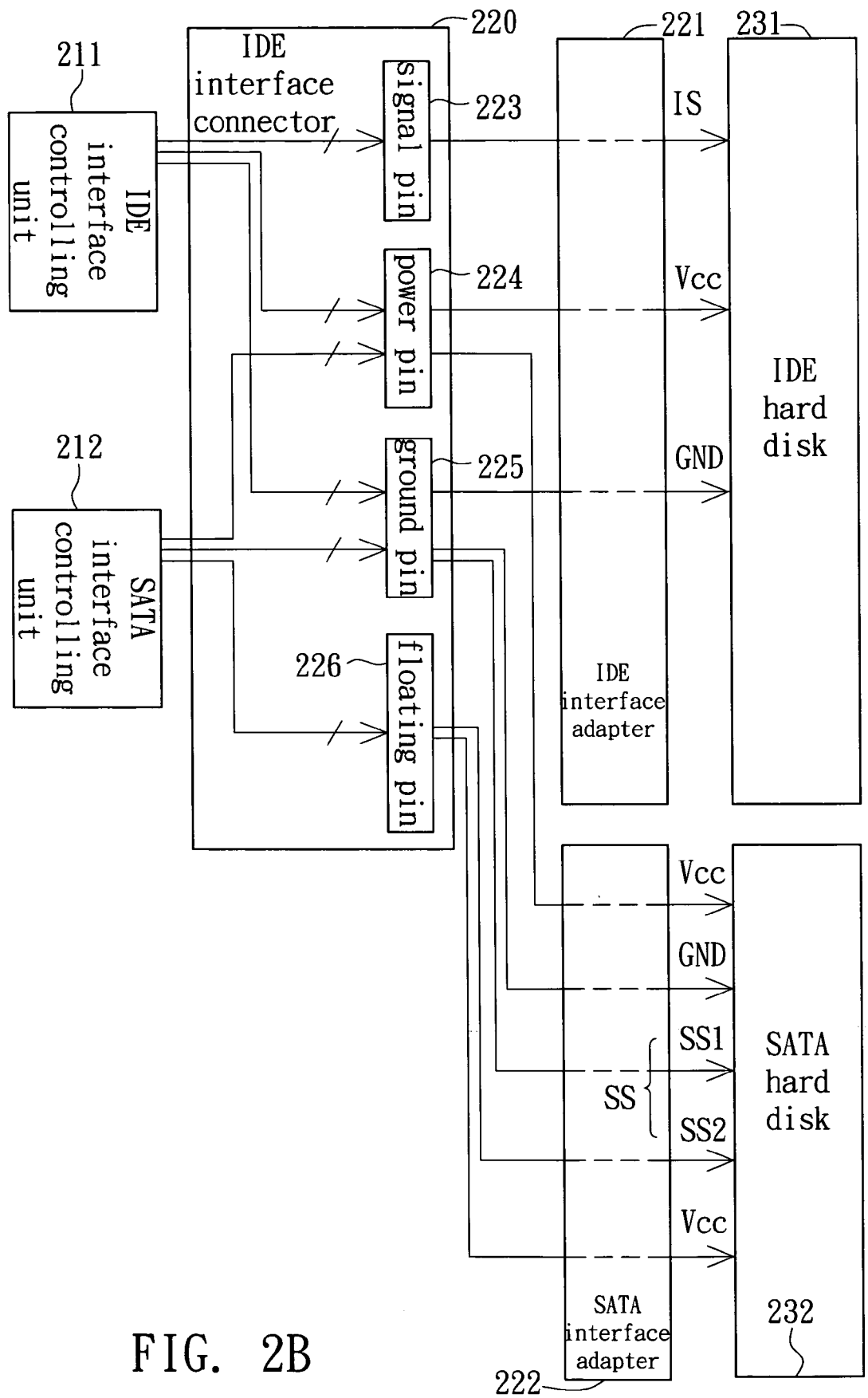
FIG. 2B is a block diagram of the selective coupling of the IDE interface connector in FIG. 2A with the IDE hard disk or the SATA hard disk.

Referring to FIG. 2B, a block diagram of the selective coupling of the IDE interface connector 220 in FIG. 2A with the IDE hard disk 231 or the SATA hard disk 232 is shown. The IDE interface connector 220 generally includes a number of signal pins 223, power pins 224, ground pins 225, and floating pins 226. As shown in Table 1, the signal pins 223 are, for example, the IDE interface pins 1, 3~18, 21, 23, 25, 27~29, 31, and 33~39. The power pins 224 are, for example, the IDE interface pins 41 and 42. The ground pins 225 are, for example, the IDE interface pins 2, 19, 22, 24, 26, 30, 40, and 43. The floating pins 226 are, for example, the IDE interface pins 20, 32, and 44.

TABLE 1

| IDE interface pin | Signal name | Annotation | IDE interface pin | Signal name | Annotation |
| --- | --- | --- | --- | --- | --- |
| 1 | IDE1RST# |  | 2 | GND | Corresponding to the SATA ground pin S1 |
| 3 | D7 |  | 4 | D8 |  |
| 5 | D6 |  | 6 | D9 |  |
| 7 | D5 |  | 8 | D10 |  |
| 9 | D4 |  | 10 | D11 |  |
| 11 | D3 |  | 12 | D12 |  |
| 13 | D2 |  | 14 | D13 |  |
| 15 | D1 |  | 16 | D14 |  |

TABLE 1-continued

| IDE interface pin | Signal name | Annotation | IDE interface pin | Signal name | Annotation |
| --- | --- | --- | --- | --- | --- |
| 17 | D0 | | 18 | D15 | |
| 19 | GND | | 20 | NC | |
| 21 | DMAREQ | | 22 | GND | Corresponding to the SATA signal pin S2 |
| 23 | IOWR# | | 24 | GND | Corresponding to the SATA signal pin S3 |
| 25 | IORD# | | 26 | GND | Corresponding to the SATA ground pin S4 |
| 27 | IORDY | | 28 | SPSYNC/CSEL1 | |
| 29 | DMACK | | 30 | GND | Corresponding to the SATA signal pin S5 |
| 31 | IRQ | | 32 | IOCS16/NC | Corresponding to the SATA signal pin S6 |
| 33 | A1 | | 34 | PDIAG/IDE_PATADET | |
| 35 | A0 | | 36 | A2 | |
| 37 | CS1# | | 38 | CS3# | |
| 39 | DASP/IDEACT# | | 40 | GND | Corresponding to the SATA ground pin S7 |
| 41 | 5VHDD | Corresponding to the SATA power pin P7 | 42 | 5VHDD | Corresponding to the SATA power pin P8 |
| 43 | GND | Corresponding to the SATA ground pin P12 | 44 | NC | Corresponding to the SATA power pin P9 |

As the IDE interface connector 220 is electrically coupled with the IDE hard disk 231, the signal pins 223, the power pins 224, and parts of the ground pins 225, electrically coupled with the IDE-interface controlling unit 211, respectively output the IDE signals IS, such as data signals or command signals, the power voltage Vcc, such as 5V, and the ground voltage GND. At the same time, the floating pins 226 are not used by the IDE hard disk 231. That is, as the portable computer 200 is configured with the IDE hard disk 231, the IDE-interface controlling unit 211 controls the IDE hard disk 231 via the signal pins 223, the power pins 224, and parts of the ground pins 225 and the SATA-interface controlling unit 212 is unused.

Figure 2C:
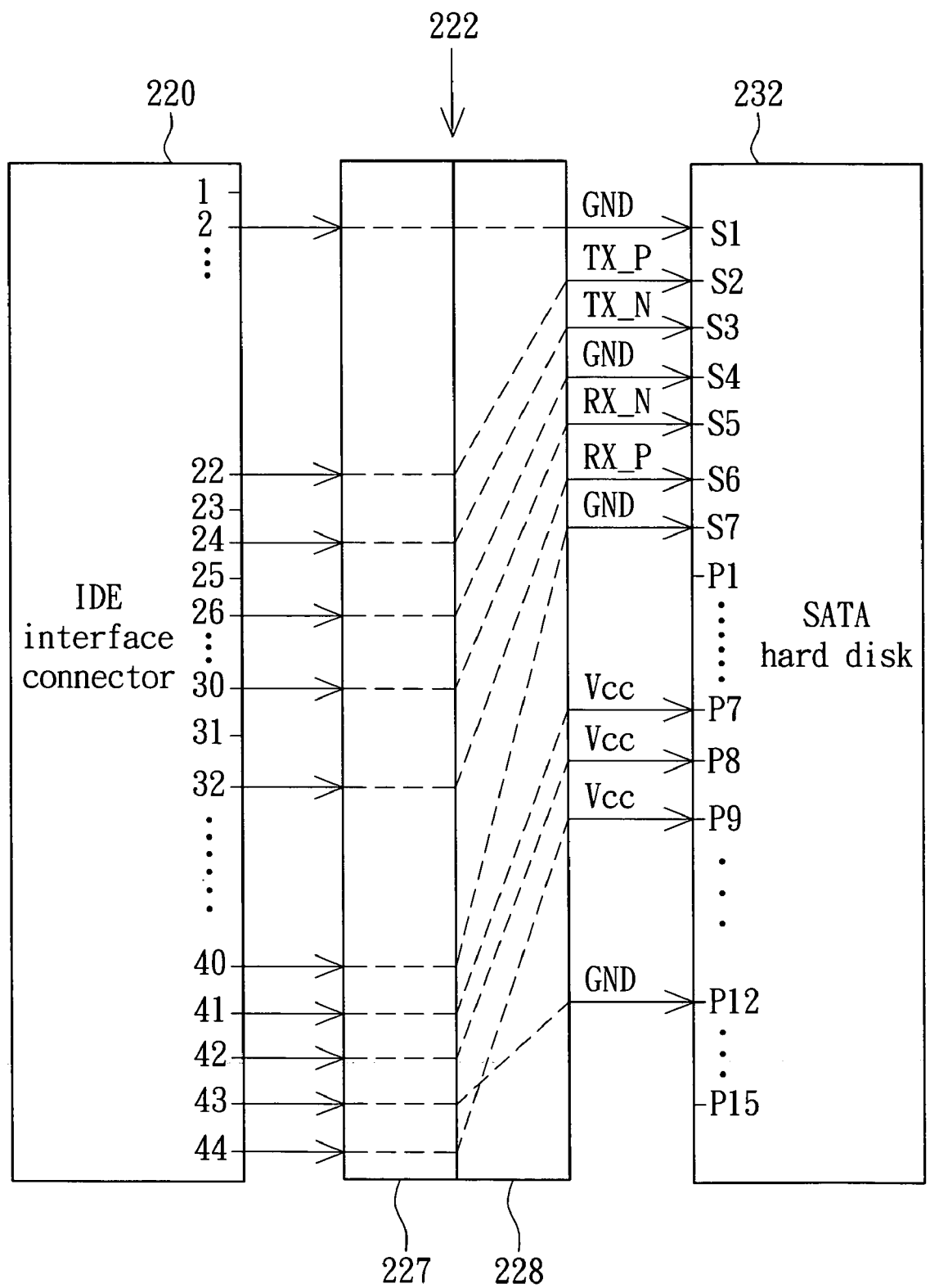
FIG. 2C is a block diagram of the electrical coupling of the IDE interface connector in FIG. 2B with the SATA hard disk via the SATA interface adapter.

Referring to FIG. 2C, a block diagram of the electrical coupling of the IDE interface connector in FIG. 2B with the SATA hard disk 232 via the SATA interface adapter 222 is shown. One of the main features of the invention lies on as the portable computer 200 is configured with the SATA hard disk 232, the SATA-interface controlling unit 212 outputs the voltage Vcc (the first power voltage) to the SATA hard disk 232 via the power pins 224, such as the IDE interface pins 41 and 42 in Table 1, and the SATA interface adapter 222, wherein the IDE interface pins 41 and 42 of the IDE interface connectors are respectively corresponding to the SATA interface pins P7 and P8 of the SATA hard disk 232. In addition, the SATA-interface controlling unit 212 outputs the ground voltage GND to the SATA hard disk 232 via parts of the ground pins 225, such as the IDE interface pins 2, 26, 40, and 43 in Table 1, and the SATA interface adapter 222, wherein the IDE interface pins 2, 26, 40, and 43 of the IDE interface connector 220 are respectively corresponding to the SATA interface pins S1, S4, S7, and P12 of the SATA hard disk 232.

The SATA-interface controlling unit 212 output the SATA signals (the third signal) SS1, such as the signals TX_P, TX_N, and RX_N, to the SATA hard disk 232 via parts of the ground pins 225, such as the IDE interface pins 22, 24, and 30 in Table 1, and the SATA interface adapter 222. The SATA-interface controlling unit 212 further output the SATA signal (the forth signal) SS2, such as the signal RX_P, to the SATA hard disk 232 via parts of the floating pins 226, such as the IDE interface pin 32 (an unused 16-bit pin) in Table 1, and the SATA interface adapter 222. The SATA-interface controlling unit 212 output the voltage Vcc (the second power voltage) to the SATA hard disk 232 via the floating pins 226, such as the IDE interface pin 44 in Table 1, and the SATA interface adapter 222, wherein the IDE interface pin 44 of the IDE interface connector 220 is corresponding to the SATA interface pin P9 of the SATA hard disk 232. As the SATA-interface controlling unit 212 controls the SATA hard disk 232, the IDE-interface controlling unit 211 can still control a CD-ROM drive (not shown in FIGS. 2B and 2C) via the signal pins 223, the power pins 224, and parts of the ground pins 225 of the IDE interface connector 220.

Therefore, as the portable computer 200 is configured with the SATA hard disk 232, the SATA-interface controlling unit 212 output the second signal SS, such as data signals or command signals, including the third signal SS1 and the forth signal SS2, to the SATA hard disk 232 via parts of the ground pins 225 and parts of the floating pins 226 and the SATA interface adapter 222.

As shown in FIG. 2C, the SATA interface adapter 222 includes an IDE adapting part 227 having 44 pin sockets and a SATA adapting part 228 having 22 pin sockets for respectively coupling with the 44-pin IDE interface connector 220 and the 22-pin SATA interface connector of the SATA hard disk 232. As mentioned above, the IDE interface pins 2, 22, 24, 26, 30, 32, and 40~44 are electrically coupled with the SATA interface adapting part 228 via the corresponding pin sockets of the IDE interface adapting part 227, and rearranged to couple with the SATA interface pins S1~S7, P7~P9, and P12 of the SATA hard disk 232 via the SATA interface adapting part 228.

The IDE interface adapter 221 simply one-to-one corresponds the IDE interface pins of the IDE interface connector 220 to the IDE interface pins of the IDE hard disk 231, thereby preventing the pins of the IDE hard disk 232 being damaged as the IDE hard disk 232 is directly installed into the IDE interface connector 220.

As mentioned above, the portable computer 200 selectively coupled with the IDE hard disk 231 and the SATA hard disk 232 via the IDE interface connector 220 is taken as an example for illustration. However, the portable computer 200 in the invention can be also selectively configured with the first hard disk or the second hard disk via a proper interface connector. The interface pins of the interface connector include the first interface pins, the second interface pins, and the common pins. The controller 210 has a first interface controlling unit, which can output the first interface signals to the first hard disk via the first interface pins, and a second interface controlling unit, which can output the second interface signals to the second hard disk via the second interface pins. The first and the second interface controlling units can output the power voltage and the ground voltage to the first and the second hard disks via the common pins. Therefore, the requirement that the portable computer in the invention is selectively configured with two different type hard disks via one interface connector can be achieved.

According to the above-mentioned preferred embodiment, the advantage of the invention lies on the SATA-interface controlling unit can transmit signals to the SATA hard disk via parts of the ground pins and the floating pins of the IDE interface connector, and the IDE-interface controlling unit and the SATA-interface controlling unit can output the power voltage and the ground voltage respectively to the IDE hard disk and the SATA hard disk via parts of the power pins and the ground pins of the IDE interface connector. Therefore, the portable computer in the invention can be selectively configured with the IDE hard disk or the SATA hard disk by one interface connector, and the requirement that the volume of the portable computer is reduced can be achieved.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A portable computer, capable of being selectively configured with a first hard disk or a second hard disk, the portable computer comprising:
   a controller, comprising;
      a first interface controlling unit, for controlling the first hard disk; and
      a second interface controlling unit, for controlling the second hard disk;
   an interface connector, electrically coupled with the first interface controlling unit and the second interface controlling unit, capable of being selectively electrically coupled with the first hard disk or the second hard disk, the interface connector comprising:
      a plurality of first interface pins, electrically coupled with the first interface controlling unit, for outputting a plurality of first signals as the interface connector is electrically coupled with the first hard disk;
      a plurality of second interface pins, electrically coupled with the second interface controlling unit, for outputting a plurality of second signals as the interface connector is electrically coupled with the second hard disk; and
      a plurality of common pins, electrically coupled with the first interface controlling unit and the second interface controlling unit, for outputting a ground voltage and a power voltage as the interface connector is electrically coupled with the first hard disk or the second hard disk; and a second interface adapter, for coupling the interface connector with the second hard disk and correspondingly electrically coupling the second interface pins and the common pins with the second hard disk as the portable computer is configured with the second hard disk;
   wherein as the portable computer is configured with the first hard disk, the first interface controlling unit controls the first hard disk via the first interface pins and the common pins of the interface connector, and as the portable computer is configured with the second hard disk, the second interface controlling unit controls the second hard disk via the second interface pins and the common pins of the interface connector and via the second interface adapter.

2. The portable computer according to claim 1, wherein the first hard disk is an integrated drive electronics (IDE) hard disk, and the second hard disk is a serial advanced technology attachment (SATA) hard disk.

3. The portable computer according to claim 2, wherein the first interface controlling unit is an IDE-interface controlling unit, the second interface controlling unit is a SATA-interface controlling unit, and the interface connector is an IDE interface connector.

4. The portable computer according to claim 3, wherein the first interface pins are the signal pins of the IDE interface connector, the second interface pins are parts of the ground pins and parts of the floating pins of the IDE interface connector, and the common pins are the power pins and parts of the ground pins of the IDE interface connector.

5. The portable computer according to claim 4, wherein the first signals are the IDE interface signals and the second signals are the SATA interface signals.

6. The portable computer according to claim 1, wherein the second interface adapter comprises a first adapting part and a second adapting part for respectively electrically coupling with the interface connector and the second hard disk, and the second interface pins and the common pins of the interface connector are correspondingly electrically coupled with the second hard disk via the second adapting part.

7. The portable computer according to claim 1, wherein the portable computer comprises a first interface adapter for coupling the interface connector with the first hard disk and correspondingly electrically coupling the first interface pins and the common pins with the first hard disk as the portable computer is configured with the first hard disk.

8. The portable computer according to claim 1, wherein the controller is a south bridge chip, and the controller and the interface connector are installed on a circuit board.

9. A portable computer, capable of being selectively configured with a first hard disk or a second hard disk, the portable computer comprising:
   a controller, comprising:
      a first interface controlling unit, for controlling the first hard disk; and
      a second interface controlling unit, for controlling the second hard disk;
   an interface connector, electrically coupled with the first interface controlling unit and the second interface controlling unit, and capable of being selectively electrically coupled with the first hard disk or the second hard disk, the interface connector comprising:
      a plurality of signal pins, electrically coupled with the first interface controlling unit, for outputting a plurality of first signals as the interface connector is electrically coupled with the first hard disk;

a plurality of power pins, electrically coupled with the first interface controlling unit, for outputting a first power voltage as the interface connector is electrically coupled with the first hard disk;

a plurality of ground pins, wherein parts of the ground pins are electrically coupled with the first interface controlling unit, for outputting a ground voltage; and a plurality of floating pins, wherein the floating pins are not used by the first hard disk as the interface connector is electrically coupled with the first hard disk; and a second interface adapter, for coupling the interface connector with the second hard disk as the portable computer is configured with the second hard disk;

wherein as the portable computer is configured with the second hard disk, the second interface controlling unit outputs the power voltage to the second hard disk via the power pins and parts of the floating pins and via the second interface adapter; the second interface controlling unit outputs the ground voltage and a plurality of third signals to the second hard disk via parts of the ground pins and via the second interface adapter; and the second interface controlling unit outputs a plurality of forth signals to the second hard disk via parts of the floating pins and the second interface adapter.

10. The portable computer according to claim 9, wherein the first hard disk is an IDE hard disk and the second hard disk is a SATA hard disk.

11. The portable computer according to claim 10, wherein the first interface controlling unit is an IDE-interface controlling unit, the second interface controlling unit is a SATA-interface controlling unit, and the interface connector is an IDE interface connector.

12. The portable computer according to claim 11, wherein as the portable computer is configured with the IDE hard disk, the SATA-interface controlling unit is unused, and as the portable computer is configured with the SATA hard disk, the IDE-interface controlling unit controls a CD-ROM drive via the IDE interface connector.

13. The portable computer according to claim 9, wherein the second interface adapter comprises a first adapting part and a second adapting part, for respectively electrically coupled with the interface connector and the second hard disk, and the power pins, the ground pins and the floating pins of the interface connector are correspondingly electrically coupled with the second hard disk via the second adapting part.

14. The portable computer according to claim 9, wherein the portable computer comprises a first interface adapter for coupling the interface connector with the first hard disk and correspondingly electrically coupling the signal pins, the power pins, and the ground pins with the first hard disk as the portable computer is configured with the first hard disk.

15. The portable computer according to claim 9, wherein as the interface connector is coupled with the second hard disk, parts of the floating pins are electrically coupled with the second interface controlling unit for outputting a second power voltage to the second hard disk.

16. The portable computer according to claim 9, wherein the controller is a south bridge chip, and the controller and the interface connector are installed on a circuit board.

* * * * *